(12) United States Patent
Baumann

(10) Patent No.: US 7,310,947 B2
(45) Date of Patent: Dec. 25, 2007

(54) INTERNAL COMBUSTION ENGINE WITH WASTE GAS TURBO-CHARGERS

(75) Inventor: Hermann Baumann, Tettnang (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 285 days.

(21) Appl. No.: 10/516,659

(22) PCT Filed: Jul. 22, 2003

(86) PCT No.: PCT/EP03/07953

§ 371 (c)(1),
(2), (4) Date: Dec. 1, 2004

(87) PCT Pub. No.: WO2004/013472

PCT Pub. Date: Feb. 12, 2004

(65) Prior Publication Data

US 2005/0172629 A1   Aug. 11, 2005

(30) Foreign Application Priority Data

Jul. 26, 2002  (DE) .............................. 102 34 040

(51) Int. Cl.
*F02B 33/44* (2006.01)
*F02B 33/00* (2006.01)
*F02B 37/007* (2006.01)
*F02B 37/00* (2006.01)
*F02C 6/12* (2006.01)

(52) U.S. Cl. ....................... 60/612; 123/562
(58) Field of Classification Search .................. 60/612; 123/562
See application file for complete search history.

(56) References Cited

U.S. PATENT DOCUMENTS

| 2,359,615 | A | * | 10/1944 | Browne et al. | 60/612 |
| 5,005,359 | A | * | 4/1991 | Tashima et al. | 60/612 |
| 5,186,005 | A | * | 2/1993 | Yoshioka et al. | 60/612 |
| 5,560,207 | A |  | 10/1996 | Ramsden et al. | 60/612 |
| 5,692,378 | A | * | 12/1997 | Ramsden | 60/612 |
| 6,378,309 | B1 | * | 4/2002 | Divecha et al. | 60/612 |
| 6,715,289 | B2 | * | 4/2004 | Mader et al. | 60/612 |
| 6,766,645 | B2 | * | 7/2004 | Zimmer et al. | 60/612 |
| 2002/0056444 | A1 |  | 5/2002 | Chou et al. | 60/612 |

FOREIGN PATENT DOCUMENTS

| DE | 31 01 623 A1 | 10/1982 |
| DE | 43 30 525 A1 | 3/1995 |
| DE | 19524566 | 6/1996 |
| EP | 0 710 770 A1 | 5/1996 |
| FR | 1478761 A * | 4/1967 |
| GB | 2302914 | 2/1997 |
| GB | 2302914 A * | 2/1997 |

* cited by examiner

*Primary Examiner*—Thai-Ba Trieu
(74) *Attorney, Agent, or Firm*—Klaus P. Stoffel; Wolff & Samson PC

(57) ABSTRACT

In an internal combustion engine with a first and a second exhaust gas turbocharger, which are installed in a common carrier housing, two exhaust gas turbochargers are arranged so that the two charger axes are at an angle to each other which is in the range of 55-100° and lie in the same plane. As a result, the two exhaust gas streams can be brought together with low turbulence even though the manifold is short, and a more compact set of external dimensions can be obtained for the internal combustion engine.

6 Claims, 2 Drawing Sheets

INTERNAL COMBUSTION ENGINE WITH WASTE GAS TURBO-CHARGERS

PRIORITY CLAIM

This is a U.S. national stage of International Application No. PCT/EP2003/007953, filed on Jul. 22, 2003. Priority is claimed on that application and on the following application:
Country: Germany, Application No. 102 34 040.4, Filed: Jul. 26, 2002.

BACKGROUND OF THE INVENTION

It is known that exhaust gas turbochargers can be used in internal combustion engines to boost power. DE 195 24 566 C1 describes an internal combustion engine with exhaust gas turbochargers, which are installed in a carrier housing. The turbines are located inside the carrier housing, and the compressors are located outside the carrier housing. The turbines are supplied in parallel with the exhaust gas through a common exhaust gas feed line. After the exhaust gas has flowed through the turbines, it is collected in a manifold; a Y-pipe is shown in the reference. The arrangement is selected so that the exhaust gas is collected from turbines which are opposite each other. As a result, the manifold must be quite long. The outside dimensions of the carrier housing are based on the number of exhaust gas turbochargers, on their size, and on the exhaust gas feed line or manifold.

In practice, the carrier housing with its feed and discharge components is mounted on top of the internal combustion engine. This increases the amount of space required to accommodate the internal combustion engine. In the case of ships and military vehicles, an increase in the need for space can be a problem.

SUMMARY OF THE INVENTION

The invention is based on the task of designing an internal combustion engine with a first and a second exhaust gas turbocharger, where the two turbochargers are mounted in a carrier housing and are of compact dimensions.

The invention provides that the two exhaust gas turbochargers are arranged in such a way that the axes of the two chargers are at an angle of 55-100° to each other and lie on the same plane. The plane is parallel to the top of the engine. This arrangement has the effect of bringing the exhaust gas volumes of the two exhaust gas streams together with low turbulence downstream of the two turbochargers. Another advantage is that the manifold is shorter than that known according to the state of the art.

The air feed lines for supplying uncompressed air to the two exhaust gas turbochargers are located on the outside, above the cylinder heads. In addition, a filter can be installed in the upstream direction of the air feed lines on the unpressurized side of the turbine wheel. Because of the way in which the air feed lines are arranged, the need for space is reduced; that is, an internal combustion engine with the exhaust gas turbochargers has more compact external dimensions.

In an elaboration of the invention, it is provided that a third exhaust gas turbocharger is isntalled inside the carrier housing, the axis of this charger lying in the same plane as the other two within the above-mentioned angular range. The exhaust gas of this centrally located exhaust gas turbocharger is guided into the common manifold. In this variant, the exhaust gas streams for the first and second turbochargers are preferably provided with wastegates for switching registers. The air is supplied to the third exhaust gas turbocharger through branch lines leading from the air feeds to the first and second turbochargers. Because the branch lines are downstream from the filters, the third exhaust gas turbocharger does not need its own filter. This also reduces the amount of space required.

The charging air compressed by the turbochargers is collected in a charging air conduit, which is located centrally in the "V" formed by the cylinders.

BRIEF DESCRIPTION OF THE DRAWING

An exemplary embodiment of the invention is shown in the drawing. Identical components are designated by the same reference numbers.

DETAILED DESCRIPTION OF THE INVENTION

Figure 1:
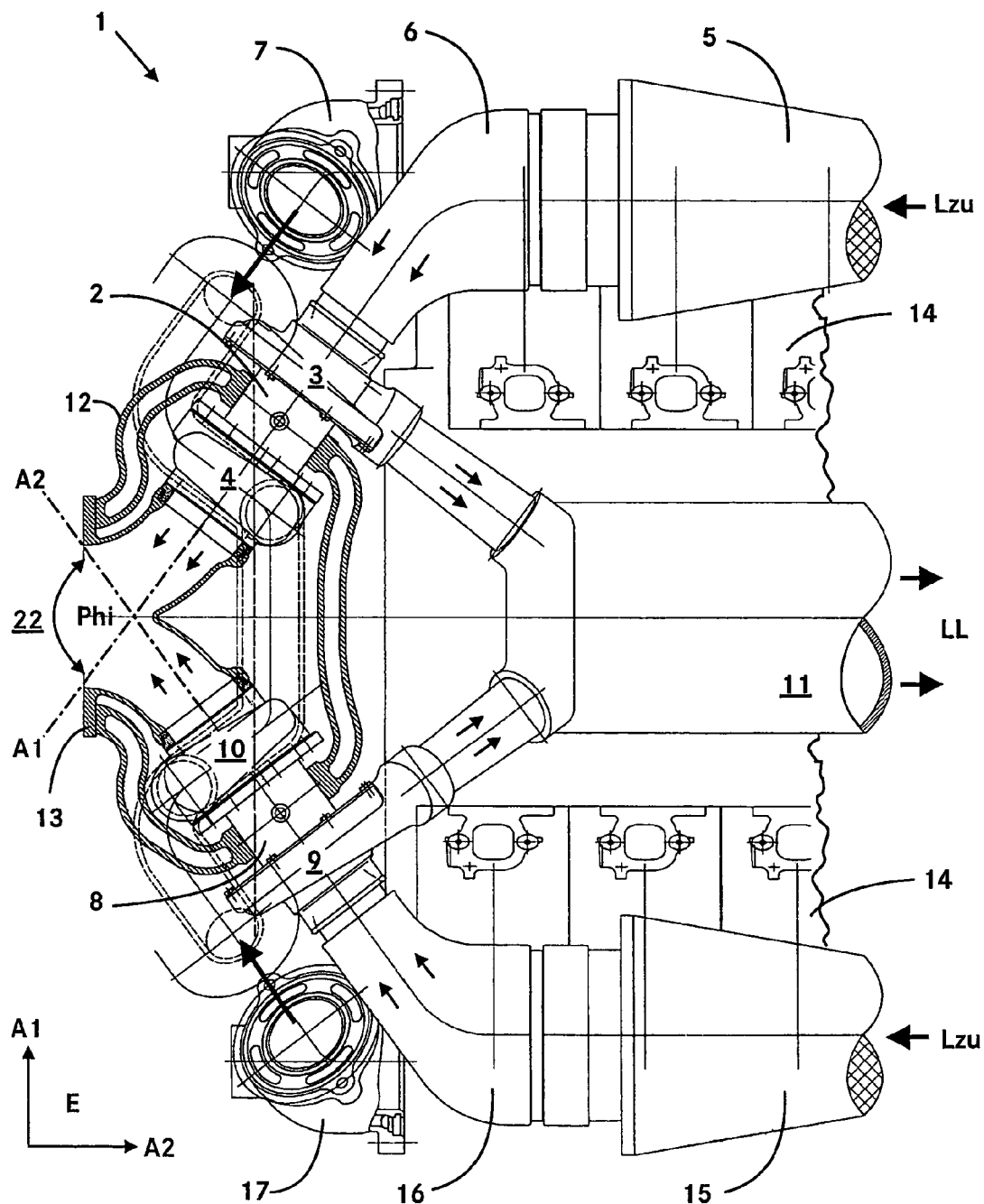
FIG. 1 shows an internal combustion engine with a first and a second exhaust gas turbocharger.

FIG. 1 shows a top view of an internal combustion engine 1 with a first exhaust gas turbocharger 2 and a second exhaust gas turbocharger 8. Knowledge of the functionality of exhaust gas turbochargers is assumed in the following.

The first exhaust gas turbocharger 2 comprises a compressor wheel 3 and a turbine wheel 4, connected to each other by a shaft. The axis of rotation of the compressor wheel 3 and the turbine wheel 4 is designated in FIG. 1 as the charger axis A1. Through an air feed line 6, preceded by a filter 5, uncompressed air $L_{zu}$ is conveyed by the compressor wheel 3 into a charging air conduit 11. The direction of flow is indicated by arrows. The air feed line 6 for uncompressed air to the first exhaust gas turbocharger 2 is mounted above the cylinder heads 14. Through an exhaust gas feed line 7, exhaust gas is supplied to the turbine wheel 4 of the first exhaust gas turbocharger 2. After this has flowed centripetally through the turbine wheel 4, it is guided into a manifold 13.

The second exhaust gas turbocharger 8 comprises a compressor wheel 9 and a turbine wheel 10. The axis of rotation of the second exhaust gas turbocharger 8 is designated in FIG. 1 as the charger axis A2. Through an air feed line 16, preceded by a filter 15, uncompressed air $L_{zu}$ is supplied to the compressor wheel 9. The air feed line 16 for uncompressed air to the second exhaust gas turbocharger 8 is mounted above the cylinder heads 14. The compressor wheel 9 conveys the air into the charging air conduit 11. Through an exhaust gas feed line 17, exhaust gas from the internal combustion engine 1 is supplied to the turbine 10. After the exhaust gas has flowed centripetally through the turbine 10, it is combined in the manifold 13 with the exhaust gas from the first exhaust gas turbocharger 2.

The two exhaust gas turbochargers 2 and 8 are mounted in a carrier housing 12. Their turbines 4 and 10 are inside the carrier housing 12, whereas the compressor wheels 3 and 9 are outside the carrier housing 12. The manifold 13 is also installed inside the carrier housing 12. One of the two exhaust gas turbochargers can be provided with a wastegate for register charging. On the left in the plane of the drawing, a central exhaust gas discharge line 22 is connected to the manifold 13. The first and second exhaust gas turbochargers 2, 8 are mounted in the carrier housing 12 in such a way that the two charger axes A1 and A2 are at an angle to each other of 55-100° and lie in the same plane E. The angle is designated "Phi" in FIG. 1. With this arrangement, the two exhaust gas streams are brought together with low turbulence even though the manifold 13 is short.

It can be seen from FIG. 1 that the charger axes A1 and A2, the exhaust gas discharge line 22, and the air feed lines 6 and 16 are all on the same plane. They are parallel to the top surface of the internal combustion engine 1. As a result of this arrangement, a high packing density and thus a more compact set of external dimensions is obtained for the internal combustion engine 1.

Figure 2:
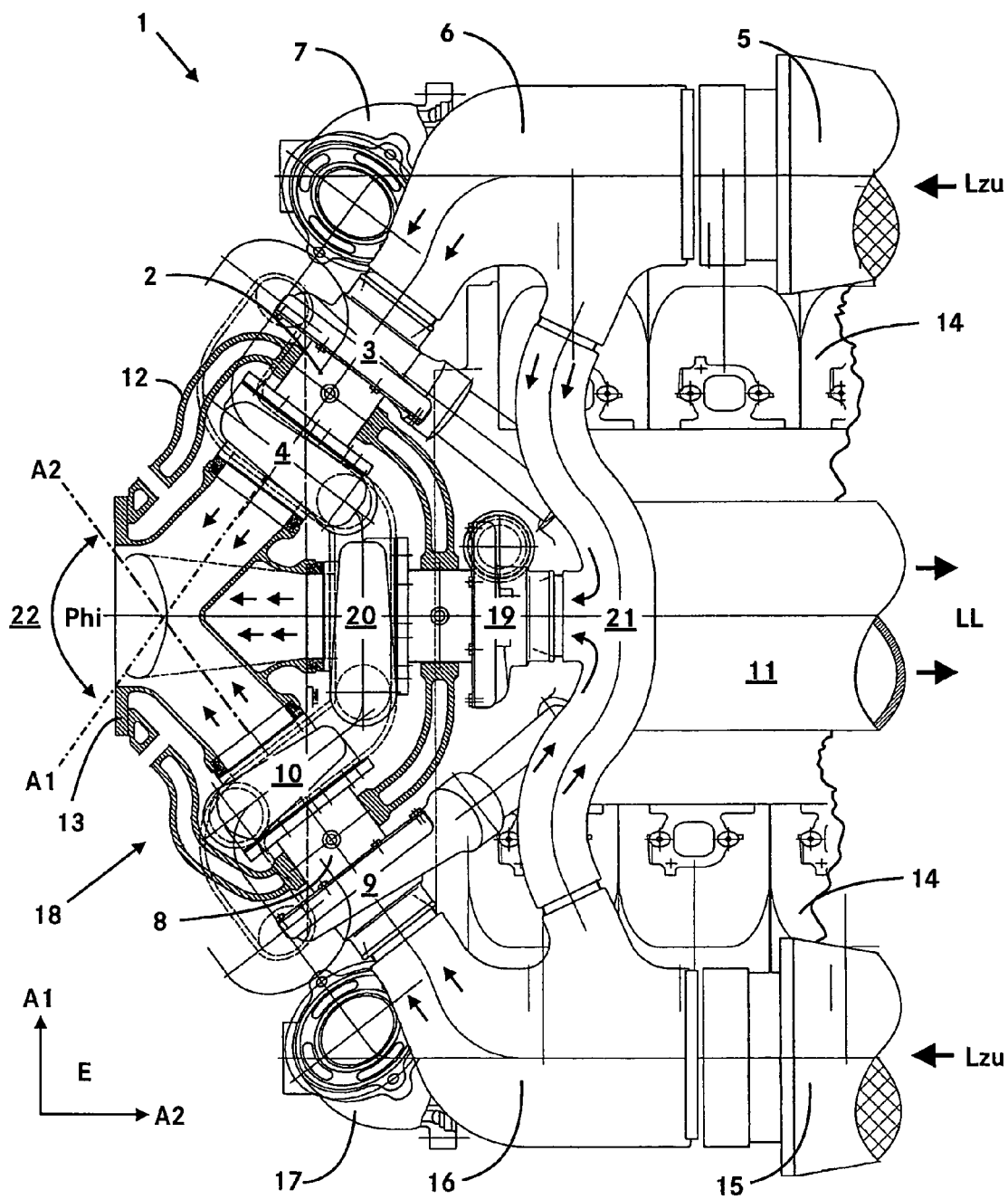
FIG. 2 shows an internal combustion engine with three exhaust gas turbochargers.

FIG. 2 shows an internal combustion engine 1 in which a third exhaust gas turbocharger 18 is also provided inside the carrier housing 12. The charger axis of the third exhaust gas turbocharger 18 is in the same plane E as the charger axes A1 and A2 of the first and second exhaust gas turbochargers 2, 8. The charger axis of the third exhaust gas turbocharger 18 divides the angle Phi into two equal parts of, for example, 50° each. Uncompressed air is supplied to the compressor wheel 19 of the third exhaust gas turbocharger 8 through branch lines 21 leading from the air feed line 6 and from the air feed line 16. The exhaust gas flowing through the third exhaust gas turbocharger 18 (turbine wheel 20) is sent to the manifold 13. The charging air conveyed by the compressor wheel 19 is sent to the common charging air conduit 11. This is located centrally in the "V" formed by the cylinders.

The invention offers the following advantages:

because of the way in which the exhaust gas turbochargers are arranged within the specified angular range and in the same plane, the exhaust gas volumes downstream from the two exhaust gas turbochargers are combined with low turbulence even though the manifold is short;

because of the way in which the exhaust gas turbochargers are arranged, the carrier housing can be made smaller than that according to the state of the art;

because of the way in which the air feed lines for uncompressed air are arranged above the cylinder heads, a greater packing density and a smaller set of outside dimensions for the internal combustion engine are obtained; and internal combustion engines within the same model series can have either a 2-charger or a 3-charger arrangement with little difference with respect to the number of parts.

The invention claimed is:

1. An internal combustion engine with a first, a second and a third exhaust gas turbocharger for charging the internal combustion engine, each of the exhaust gas turbochargers comprises a compressor wheel and a turbine wheel, which rotate around a common charger axis, a first exhaust gas feed line arranged to lead to the first exhaust gas turbocharger, a second exhaust gas feed line arranged to lead to the second exhaust gas turbocharger, the three exhaust gas turbochargers having parallel air flows, a carrier housing arranged to hold the three exhaust gas turbochargers, a manifold arranged to collect exhaust gas streams downstream of the first and second exhaust gas turbochargers, and a common exhaust gas discharge line connected to the turbochargers, the three exhaust gas turbochargers being arranged to lie in a common place (E), the two charger axes of the first exhaust gas turbo charger and the second exhaust gas turbo charger are positioned at an angle to each other in an angular range of 55-100 and the charger axis of the third exhaust gas turbocharger lies within the angular range, the third exhaust gas turbo charger being arranged centrally between the first exhaust gas turbocharger and the second exhaust gas turbocharger, wherein a branch line for feeding uncompressed air to the third exhaust gas turbocharger is arranged in the air feed lines so as to feed in uncompressed air to the first gas exhaust gas turbocharger and to the second exhaust gas turbocharger.

2. The internal combustion engine according to claim 1, wherein the plane is parallel to a top of the internal combustion engine.

3. The internal combustion engine according to claim 1, wherein the exhaust gas discharge line is arranged to lie in the plane.

4. The internal combustion engine according to claim 1, wherein the engine includes cylinder heads and further comprises air feed lines located above the cylinder heads for supplying uncompressed air to the first and second exhaust gas turbochargers.

5. The internal combustion engine according to claim 4, and further comprising a filter installed in the air feed lines upstream of the exhaust gas turbochargers.

6. The internal combustion engine according to claim 1, wherein the exhaust gas of the third exhaust gas turbocharger is guided into the manifold.

* * * * *